United States Patent
Hikmet et al.

(10) Patent No.: US 12,111,050 B2
(45) Date of Patent: Oct. 8, 2024

(54) LASER LIGHTING DEVICE

(71) Applicant: SIGNIFY HOLDING B.V., Eindhoven (NL)

(72) Inventors: Rifat Ata Mustafa Hikmet, Eindhoven (NL); Ties Van Bommel, Horst (NL)

(*) Notice: Subject to any disclaimer, the term of this patent is extended or adjusted under 35 U.S.C. 154(b) by 0 days.

(21) Appl. No.: 18/293,323

(22) PCT Filed: Jul. 25, 2022

(86) PCT No.: PCT/EP2022/070807
§ 371 (c)(1),
(2) Date: Jan. 29, 2024

(87) PCT Pub. No.: WO2023/006671
PCT Pub. Date: Feb. 2, 2023

(65) Prior Publication Data
US 2024/0271775 A1    Aug. 15, 2024

(30) Foreign Application Priority Data
Jul. 29, 2021   (EP) .................................. 21188564

(51) Int. Cl.
*F21V 9/32* (2018.01)
*F21V 7/24* (2018.01)
*F21V 29/70* (2015.01)
*F21Y 115/30* (2016.01)
*H05B 47/105* (2020.01)

(52) U.S. Cl.
CPC .................. *F21V 9/32* (2018.02); *F21V 7/24* (2018.02); *F21V 29/70* (2015.01); *H05B 47/105* (2020.01); *F21Y 2115/30* (2016.08)

(58) Field of Classification Search
CPC ... F21V 9/32; F21V 7/24; F21V 29/70; F21V 29/56; F21V 29/57; F21V 29/58; F21V 29/89; H05B 47/105; F21Y 2115/30
See application file for complete search history.

(56) References Cited

U.S. PATENT DOCUMENTS 11,262,046 B2 * 3/2022 Kondo ...................... F21V 7/26
11,287,107 B2 * 3/2022 Takaku .................... F21V 29/70
2013/0094181 A1 4/2013 Bruemmer et al.
(Continued)

FOREIGN PATENT DOCUMENTS

DE     102013013296 A1    2/2015
EP         3754386 A1 * 12/2020    ............ F21V 29/502
(Continued)

OTHER PUBLICATIONS

Yueguang et al., "A liquid metal cooling system for the thermal management of high power LEDs", vol. 37, pp. 788-791 (2010).

*Primary Examiner* — Zheng Song
*Assistant Examiner* — Glenn D Zimmerman

(57) ABSTRACT

A laser light source comprises a laser source and a ceramic phosphor tile having a light entry face for receiving laser light from the laser source for laser pumping by the laser light. A reflective coating is formed over a face opposite the light entry face. A metal layer is provided between a heat sink and the ceramic phosphor tile, wherein the metal layer has a melting point below 120° C. The metal layer thus becomes a liquid during operating temperatures, and this reduced strain on the phosphor layer while maintaining thermal contact.

15 Claims, 5 Drawing Sheets

(56) References Cited

U.S. PATENT DOCUMENTS

| | | |
|---|---|---|
| 2016/0040857 A1 | 2/2016 | Inoue et al. |
| 2016/0077415 A1* | 3/2016 | Motoya ................ G03B 21/204 |
| | | 427/157 |
| 2017/0023199 A1* | 1/2017 | Hamada ................ F21S 41/285 |
| 2017/0219171 A1* | 8/2017 | Sorg .................... H05B 33/145 |
| 2019/0120442 A1* | 4/2019 | Okada .................... C09K 11/00 |
| 2019/0219248 A1 | 7/2019 | Patent et al. |
| 2019/0390835 A1 | 12/2019 | Goldmann et al. |
| 2020/0012022 A1 | 1/2020 | Lenef et al. |
| 2020/0200348 A1 | 6/2020 | Romero et al. |
| 2021/0013349 A1 | 1/2021 | Newell et al. |

FOREIGN PATENT DOCUMENTS

| | | | | |
|---|---|---|---|---|
| JP | 2006144112 A | | 6/2006 | |
| JP | 2015073043 A | | 4/2015 | |
| JP | 2016058619 A | * | 4/2016 | ........... G02B 27/141 |
| JP | 2019035843 A | | 3/2019 | |
| JP | 2019197143 A | * | 11/2019 | |
| JP | 2020134823 A | * | 8/2020 | |
| JP | 2021086787 A | | 6/2021 | |
| WO | WO-2010136963 A1 | * | 12/2010 | ........... H01L 51/524 |
| WO | 2015141376 A1 | | 9/2015 | |

\* cited by examiner

LASER LIGHTING DEVICE

CROSS-REFERENCE TO PRIOR APPLICATIONS

This application is the U.S. National Phase application under 35 U.S.C. § 371 of International Application No. PCT/EP2022/070807, filed on Jul. 25, 2022, which claims the benefit of European Patent Application No. 21188564.5, filed on Jul. 29, 2021. These applications are hereby incorporated by reference herein.

FIELD OF THE INVENTION

This invention relates to laser lighting devices, and in particular using laser light sources with phosphor conversion of the laser light output.

BACKGROUND OF THE INVENTION

Laser based light sources are gathering much interest due to their potential in producing extremely high intensities. There are already products such as car headlights and projection television on the market where lasers such as laser diodes are used for pumping a phosphor.

White LED sources can give an intensity of 300 lm/mm2 whereas static phosphor-converted white laser sources can give 20,000 lm/mm2. Ce doped Garnets (YAG, LuAG) are the most suitable luminescent convertors which can be used for this purpose as in a Garnet matrix, chemical and temperature quenching only occurs above 200° C. at Ce concentrations below 0.5. For this purpose, phosphor ceramics with a size ranging from to 0.04 mm² (0.2 mm×0.2 mm) to 16 mm² (4 mm×4 mm) can be used.

One of the problems associated with such light sources is the heat management of the ceramic phosphor material. In order to provide good heat sinking of the phosphor, especially when it is used in the reflective mode, it needs to be soldered onto the heat sink. However, achieving good adhesion between the reflective metal such as aluminum or silver, and soldering it to a metal heatsink and maintaining it during the lifetime, is not easy. Furthermore, when it is cooled after soldering at around 220° C., and during the pumping of such a phosphor, the temperature can go up to 150-200° C. Thus, temperature cycling between room temperature and 200° C. takes place.

To demonstrate the problem that can arise, a numerical example will be presented. The thermal expansion coefficient of YAG is $8 \times 10^{-6}$ K$^{-1}$ while the thermal expansion coefficient of a copper heatsink is $17 \times 10^{-6}$ K$^{-1}$. The melting temperature of tin-silver-copper solder is about 220° C. This means that there is a compressive strain of:

$$\Delta L/L = (17-8) \times 10^{-6} \times (220-20) = 1.8 \times 10^{-3}$$

For a modulus of 300 GPa, there will be a compressive stress of $300 \times 1.8 \times 10^{3} = 0.54 \times 10^{9}$ N·m² (0.54 GPa).

During the temperature cycling, due to the mismatch in expansion coefficients, and a continuous stress of 0.54 GPa maintained on the ceramic phosphor tile at room temperature, the phosphor tile can become partially and sometimes totally delaminated from the heat sink and/or it is destroyed.

US2019/219248A1 discloses a light conversion package for a semiconductor light source that includes a light conversion block, a substrate, and an interconnector. The light conversion block is positioned to receive incident light from the semiconductor light source and acts to convert the incident light to light having a different spectral distribution. The interconnector attaches the light conversion block to the substrate and limits a thermal resistance between the light conversion block and the substrate so that the substrate can efficiently sink heat from the light conversion block. The interconnector and the substrate together may still provide high reflectivity.

DE102013013296A1 discloses a device comprising a ceramic converter for converting light of a first wavelength into light of a second wavelength, a metal-containing reflective coating and a heat sink. The surface of the ceramic converter is at least partially coated with the metal-containing reflective coating, the coating dissipating the heat from the converter into the heat sink. The heat sink and the metal-containing reflective coating are connected to one another via a metallic soldered connection.

US2016/040857A1 discloses a fluorescence-emitting light source unit that includes a wavelength conversion member including a front surface as a light receiving surface to receive excitation light, a phosphor, and a rear surface; and a light reflection surface provided on an outer side of the rear surface. The front surface is provided with a front side cyclic structure. The phosphor is configured to convert the excitation light received in the light receiving surface to fluorescence and to emit the fluorescence. The rear surface is provided with a rear side cyclic structure.

There is therefore a need for an improved coupling between a ceramic phosphor tile of a laser light source, in particular a laser light source, and the heatsink, to prevent this thermal delamination or destruction.

SUMMARY OF THE INVENTION

The invention is defined by the claims.

According to examples in accordance with an aspect of the invention, there is provided a laser lighting device configured, in operation, to emit phosphor-converted light, the laser lighting device comprising:

a laser light source configured to, in operation, emit laser light;

a ceramic phosphor tile configured to receive laser light emitted by the laser light source, wherein the ceramic phosphor tile is configured for at least partly converting the laser light into the phosphor-converted light, the ceramic phosphor tile having a bottom face, a top face, and at least one side face arranged between the bottom face and the top face;

a reflective layer is configured over at least part of one or more of: the top face; the bottom face; and the at least one side face;

a heat sink; and a metal layer arranged between the heat sink and the reflective layer, wherein the metal layer comprises a material having a melting point below 120° C. The laser lighting device is configured to have metal of the metal layer in liquid form during operation of the laser light source.

The laser light source of the invention makes use of a metal (buffer) layer between a reflective coating of the ceramic phosphor tile and the heat sink. The buffer layer uses metals and mixtures of metals with low melting temperature, in particular below 120° C.

The phosphor is configured so that there is metal in liquid form during operation of the laser light source. Preferably, the metal is a solid at room temperature, and melts during operation of the laser light source. Thus, during the operation when the temperature increases, the liquid metal maintains good thermal contact between the heat sink and the ceramic phosphor tile and with no force exerted onto the ceramic phosphor tile. The thermal conductivity of the liquid metal is preferably higher than 50 W/m·K and can be higher than 70W/m·K, while the thermal conductivity of the conventional tin-silver-copper solder (which is known for use in soldering the phosphor ceramic to a heat sink) is around 60W/m·K.

The reflective coating and metal layer are also for example over the side face as well as at least partially over one of the top and bottom faces. Thus, the application of force to the phosphor ceramic can be prevented on all faces which interface with the heat sink.

The metal layer for example has a melting point above 35° C. Thus, it is solid at room temperature which provides a more reliable operation of the laser lighting device resulting in a longer lifetime. The metal layer may have a melting point below 70° C. A low melting point extends the temperature range when the metal is in liquid form and thus reduces stresses.

The metal layer for example comprises an alloy comprising gallium. The alloy may further comprise one or more of tin, copper, silver, bismuth, indium, zinc and antimony.

The ceramic phosphor tile for example comprises a luminescent material, wherein the luminescent material is selected from luminescent materials of the type $A_3B_5O_{12}$:Ce, wherein A comprises one or more of Y, La, Gd, Tb and Lu, and wherein B comprises one or more of Al, Ga, In and Sc.

The ceramic phosphor material is for example a Ce-doped garnet such as Ce doped YAG or LuAG. The light entry face for example has an area in the range 0.04 $mm^2$ to 1 $cm^2$.

The reflective layer may comprise silver, aluminum, aluminum oxide, titanium dioxide, barium sulfate or boron nitride. It may be a scattering reflective layer.

The metal layer for example comprises gallium, a eutectic gallium-indium mixture or a eutectic gallium-indium-tin mixture.

The laser light source comprises a protective layer arranged between the reflective layer and the metal layer to protect the reflective layer from the metal layer. The wording "protect" especially means to prevent a chemical reaction between the reflective layer and the metal layer, or to prevent blackening of the reflective layer by the metal layer or to prevent deterioration of the reflectivity of the reflective layer by the metal layer. For example, silver and aluminum reflecting coatings react with the gallium component of the preferred material choices of the metal layer, the surface of the reflector can be covered with a metal such as nickel, titanium, or metal oxides to protect the reflective layers from the metal layer. Most suitable protective layers are nickel, titanium, and/or a metal oxide.

The ceramic phosphor tile, reflective coating and metal layer (and protective layer if present) may be formed fixed into a well within the heat sink. The laser source is then over the top of the ceramic phosphor tile, over the top of the well. A seal may be provided for sealing the metal layer into a closed volume so that it cannot escape.

A stack of the reflective layer, the metal layer, the heat sink and the protective layer, may cover the bottom face and at least part of the at least one side face. This is for example suitable for a reflective arrangement. The stack may instead only cover the side face and partially cover the bottom face for a transmissive arrangement with laser light entry into the bottom face and phosphor-converted emission from the top face.

The ceramic phosphor tile, reflective layer and metal layer may be formed fixed into a well within the heat sink. This provides good thermal coupling to the heat sink.

A seal may be provided for sealing the metal layer. This prevent leakage when the metal is in the liquid state.

A temperature sensor may be provided for sensing a temperature of the metal layer and a controller may then control the laser light source, wherein the laser light source is controlled based on the temperature sensed by the temperature sensor. The laser can be dimmed or turned off when the temperature is too high.

A laser lighting system using the laser lighting device may be selected from the group of a lamp, a luminaire, a projector device, a disinfection device, and an optical wireless communication device.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
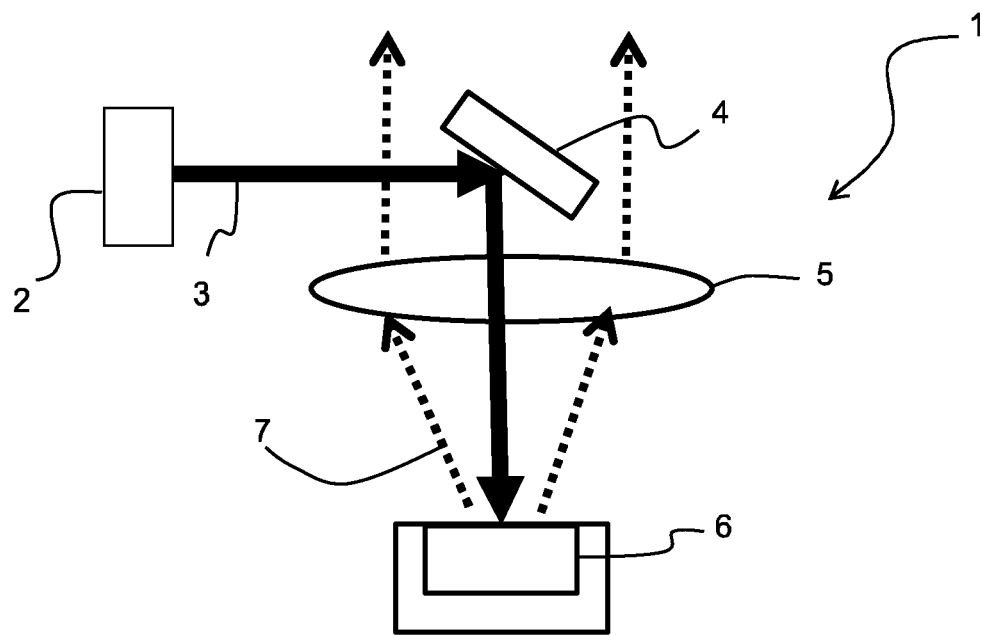
FIG. 1 shows a first configuration of a laser lighting device.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a laser light source comprises a laser source and a ceramic phosphor tile having a light entry face for receiving laser light from the laser source for laser pumping by the laser light.

A reflective coating is formed over at least some of the faces of the ceramic phosphor tile, such that at least some of the phosphor-converted light is reflected until it is directed to a light output face of the ceramic phosphor tile. A metal layer is provided between a heat sink and the ceramic phosphor tile, wherein the metal layer has a melting point below 120° C. The metal layer thus becomes a liquid during operating temperatures, and this reduces the strain on the phosphor layer while maintaining thermal contact.

The invention applies liquid metal cooling to the ceramic phosphor tile, for efficient cooling of the ceramic phosphor tile. During operation of the laser light source, when the temperature increases, the liquid metal maintains good thermal contact between the heat sink and the ceramic phosphor tile and no force is exerted onto the ceramic phosphor tile (preventing crack formation). In addition, a metal composition is selected which at room temperature is solid and becomes liquid at the operation temperature of the phosphor tile.

It is also an aspect of the invention that the position of the ceramic phosphor tile is fixed and it does not change during the use of the lighting device, for example during transportation.

Figure 2:
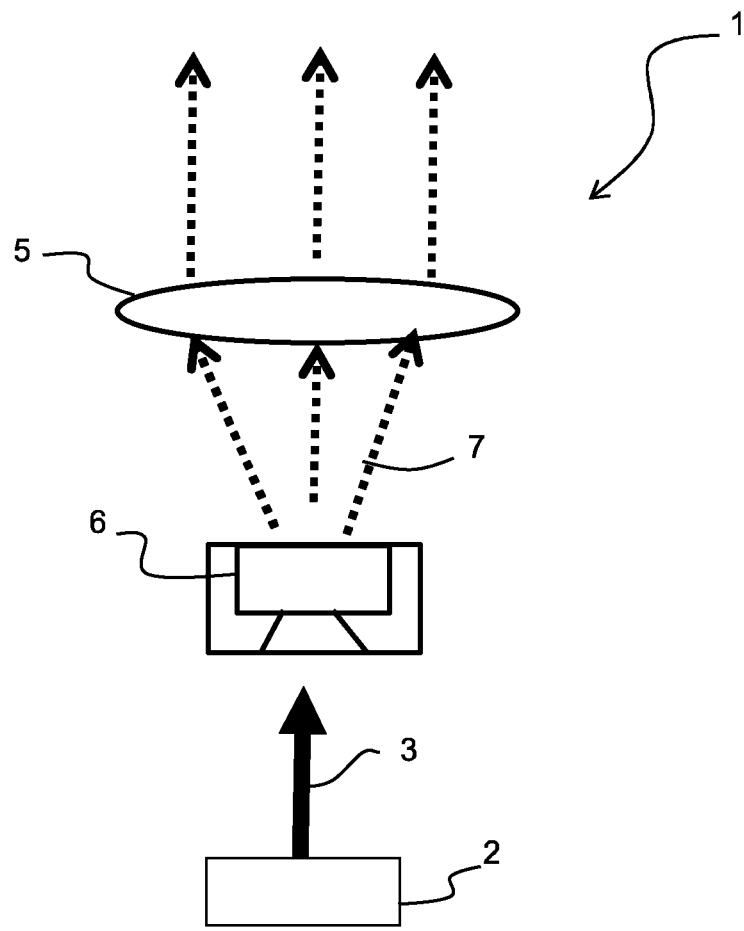
FIG. 2 shows a second configuration of a laser lighting device.

FIGS. 1 and 2 each show schematically part of a laser lighting device 1 which makes use of phosphor conversion of blue laser light, in order to generate white light from a ceramic phosphor tile.

FIG. 1 shows a laser light source 2 which generates blue laser light 3 and directs it to blue light reflector 4. The laser light is reflected towards a ceramic phosphor tile, 6 through a lens 5. The generated phosphor-converted light 7 is emitted from the face into which the laser light 3 is incident, and is shaped by the lens 5. Thus, the light is reflected from the ceramic phosphor tile 6.

FIG. 2 shows blue laser light 3 passing into the phosphor tile 6 at one face, and the generated phosphor-converted light 7 is emitted from an opposite face. It is then shaped by the lens 5. Thus, the light passes through ceramic phosphor tile 6.

The laser light is typically blue, but other laser colors may be used, such as green, yellow or red.

The invention relates to the mounting of the ceramic phosphor tile into a heat sink.

Figure 3:
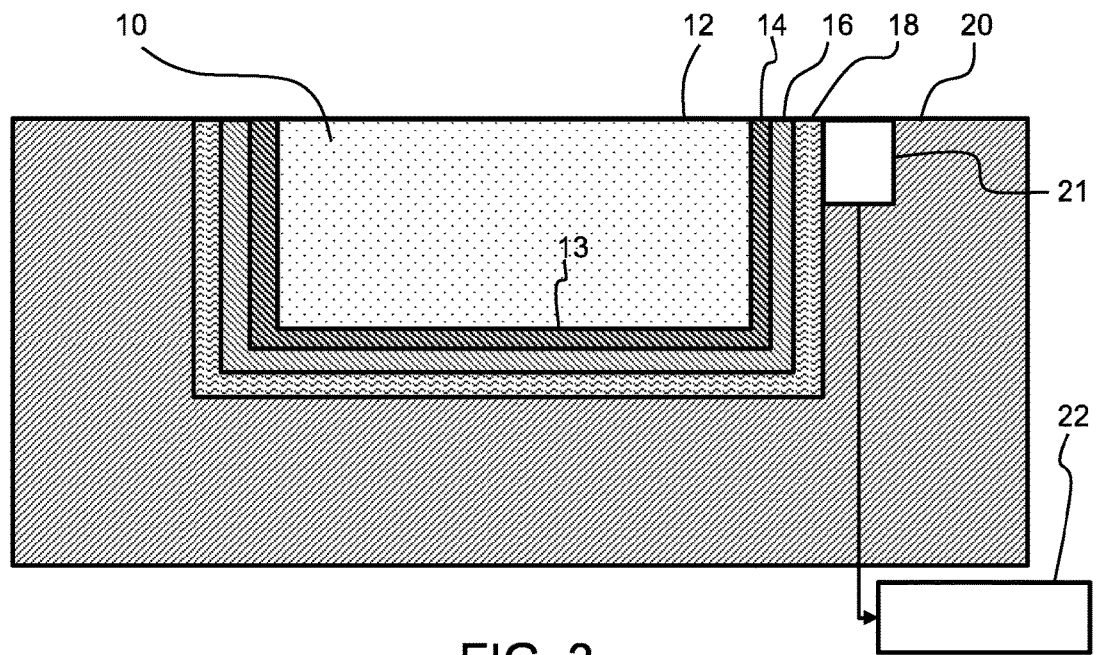
FIG. 3 shows a first example of a phosphor ceramic attached to a heatsink.

FIG. 3 shows a first example of phosphor converter and associated heat sink for use with a laser light source in the laser lighting device of FIG. 1. It thus shows an example using reflection of the laser light.

A ceramic phosphor tile 10 has a light entry face 12 for receiving laser light from the laser source for laser pumping by the laser light. The ceramic phosphor tile 10 has a top (light entry) face, an opposite rear face 13 and a side face. In the example of FIG. 3, the top face is a light entry face for the laser light as well as a light exit face for the phosphor-converted light.

A reflective coating 14 is provided at least over the rear face 13 opposite the light entry face. It is also provided over the side face in the example shown.

The light produced by the ceramic phosphor tile travelling in other directions than towards the light entry face is reflected by the reflective coating. This is to enable phosphor light to travel out from the laser entry face. The reflective coating may for example be sputter coated on the ceramic phosphor tile.

The ceramic phosphor tile 10 is formed in a well of a heat sink 20.

A metal layer 18 is provided between the heat sink 20 and the ceramic phosphor tile 10, and the metal layer 18 has a melting point below 120° C. and preferably a melting point above 35° C.

The temperature of the phosphor in use for example reaches a temperature in the range 120° C. to 150° C. The metal layer is therefore already liquid in this temperature range. Standard solder instead has a melting temperature of about 200° C., based on indium and tin which have melting temperatures of 157° C. and 232° C., respectively. To make an alloy with a temperature below 157° C., gallium may be used which has a melting temperature of 30° C.

The melting point is for example below 100° C., for example below 80° C., for example below 70° C.

A lower melting point gives rise to reduced stress. In particular, after the laser light source has switched off, the phosphor will cool down to room temperature. By having a low melting point such as below 70° C., during cooling down of the phosphor the metal layer is kept in a liquid state for longer with lower stress.

The metal layer may even have a melting point below 60° C., more preferably below 55° C. and most preferably below 50° C.

The melting point above 35° C. gives a margin above typical room temperature and it means a metal with higher melting point may be alloyed with gallium.

The ceramic phosphor tile 10 is for example a Ce-doped garnet such as Ce doped YAG or LuAG. Possible ceramic phosphor materials are discussed more fully below.

The metal layer 18 for example comprises gallium, a eutectic gallium-indium mixture or a eutectic gallium-indium-tin mixture. It may also be a single low melting metal such as indium.

The reflective coating for example comprises silver or aluminum. It may also be highly reflective (porous) $TiO_2$, $Al_2O_3$ or BN (boron nitride) layers.

Thus, a liquid metal is between the heat sink and the ceramic phosphor tile with a reflective coating such as silver or aluminum. As silver and aluminum react with the gallium component of these liquid metals, the surface of the reflector is also preferably covered, when silver or aluminum are used, with a protective layer 16 such as nickel or titanium and/or metal oxides such as $Al_2O_3$, $TiO_2$, $SiO_2$ to protect reflective layer 14. The metal layer 18 is thus between the heat sink 20 and the protective layer 16. The protective layer is thus used when the reflective layer comprises aluminum and/or silver.

The thermal conductivity of the liquid metal layer can be higher than 50W/m·K. For example, indium has thermal conductivity 86 W/m·K, and gallium has thermal conductivity 41 W/m·K. The liquid metal layer may have a thermal conductivity above 60W/m·K, or even above 70 W/m·K.

FIG. 3 also shows a temperature sensor 21 which monitors the temperature of the metal layer 18. This temperature information is provided to a controller 22 of the laser light source so that the laser light source may be turned off or dimmed when the temperature is too high.

Figure 4:
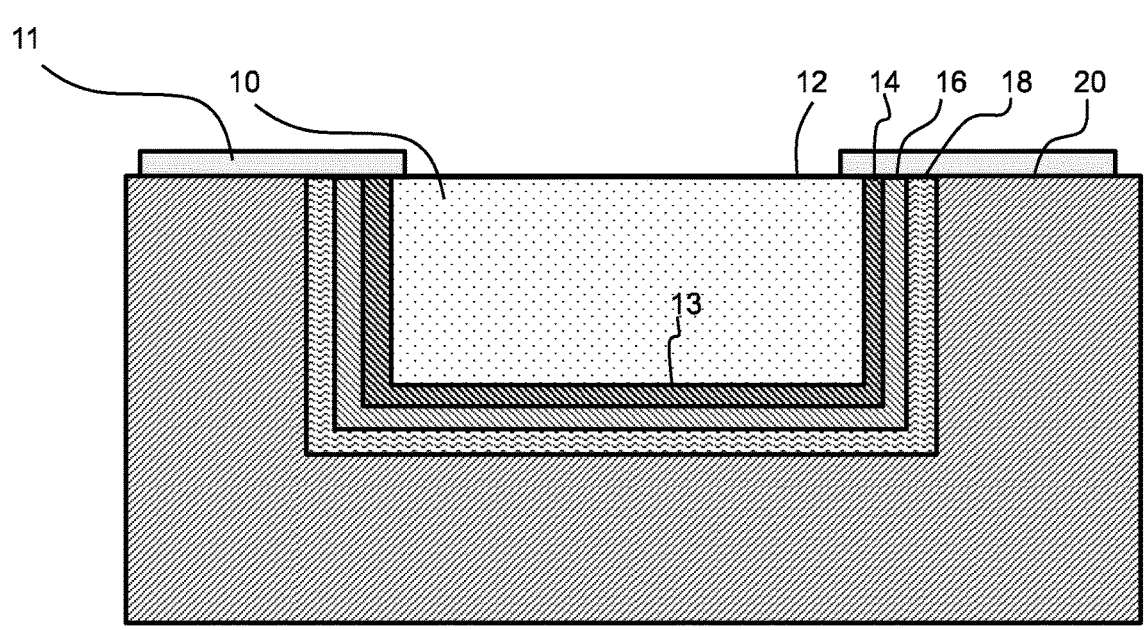
FIG. 4 shows a second example of a phosphor ceramic attached to a heatsink.

FIG. 4 shows the phosphor ceramic tile 10 in a well with clamps 11 to keep it in position. These clamps 11 can be made of a transparent material such as glass or sapphire and they could be discrete elements or they could be a single layer which covers the whole surface of the ceramic phosphor tile 10. For example, the whole top face of the ceramic phosphor tile 10 may be covered with sapphire and sealed by soldering the sapphire to the heat sink (if necessary providing the sapphire with solderable layers).

More generally, the seal may comprise a translucent plate (preferably a transparent plate) which is glued and/or soldered to the laser lighting device e.g. the heatsink.

The solder has preferably a high melting temperature e.g. >200 C and the glue is preferably a silicone material.

FIGS. 3 and 4 show designs with the ceramic phosphor tile embedded in a well of the heat sink.

Figure 5:
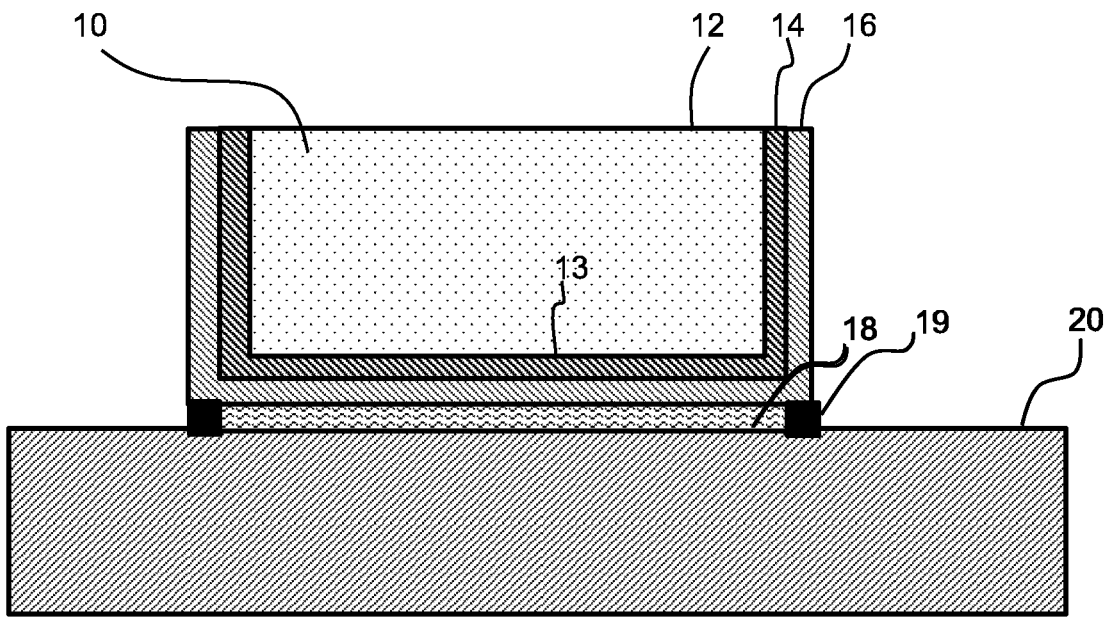
FIG. 5 shows a third example of a phosphor ceramic attached to a heatsink.
Figure 6:
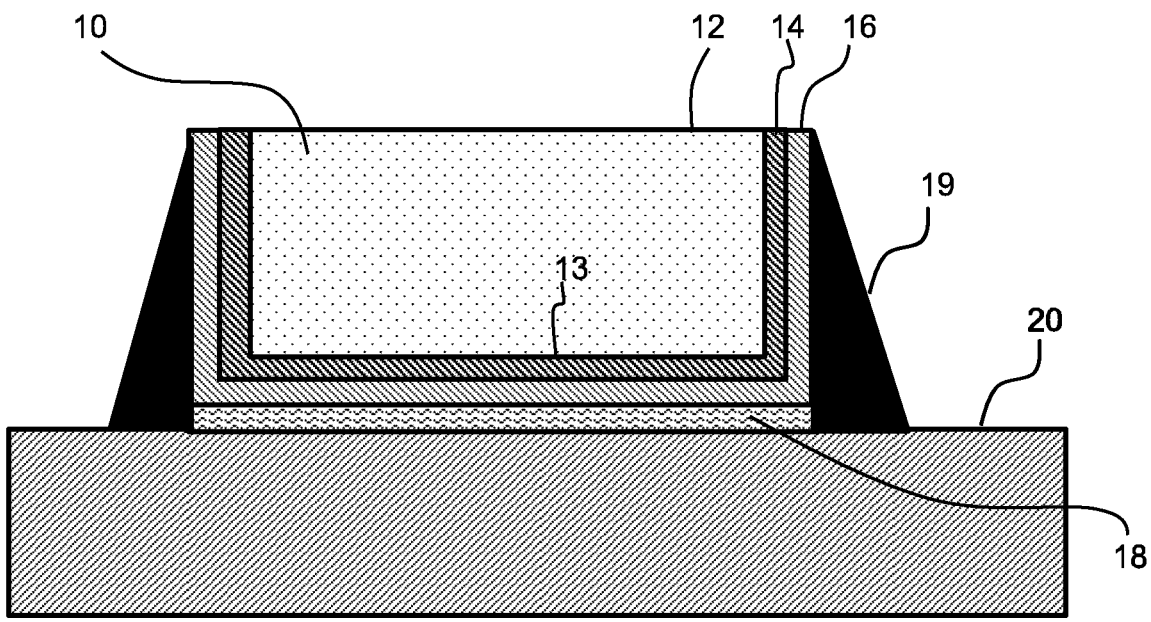
FIG. 6 shows a fourth example of a phosphor ceramic attached to a heatsink.

FIGS. 5 and 6 instead show the ceramic phosphor tile 10 mounted on top of the heat sink 20.

FIG. 5 shows the ceramic phosphor tile 10 with the reflective layer 14 and the protective layer 16 on top of the heat sink 20. The ceramic phosphor tile 10 and layers 14 and 16 together form a ceramic tile unit. Solder points 19 are applied to the bottom of the ceramic tile unit to prevent the ceramic phosphor tile 10 from moving. The metal layer 18 is then between a bottom surface of the ceramic tile unit and the heat sink 20 (in particular between the heat sink and the protective layer).

FIG. 6 shows a similar design to FIG. 5 but in which the solder points 19 are applied to the sides of the ceramic tile unit, in particular to the sides of the protective layer.

Figure 7:
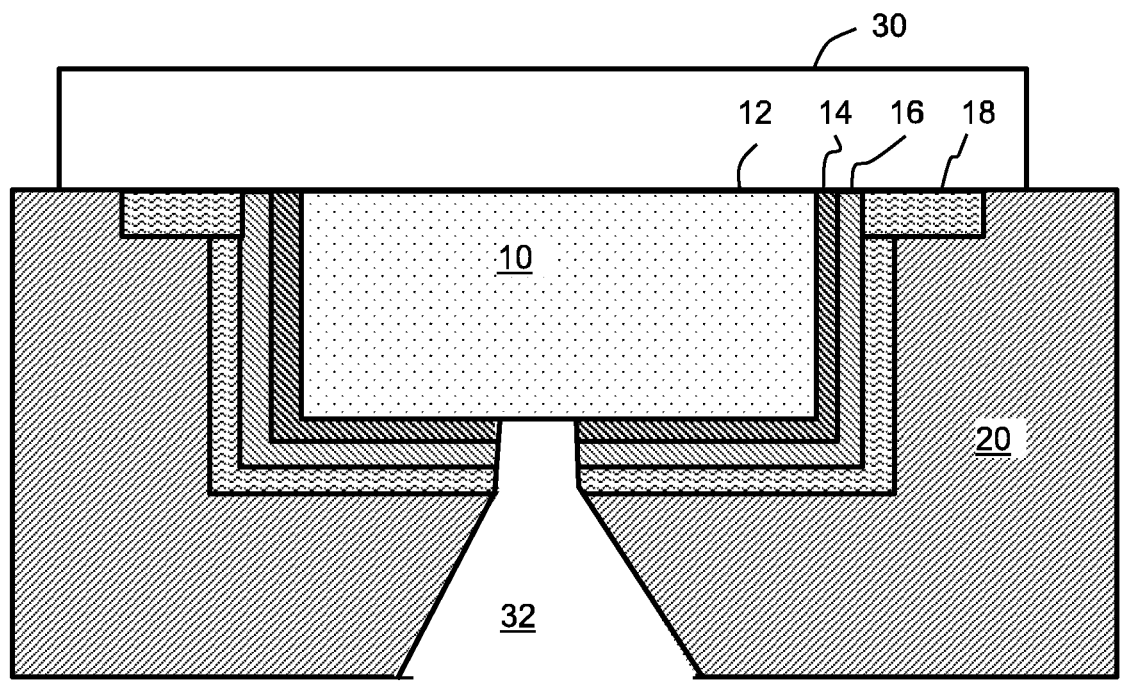
FIG. 7 shows a fifth example of a phosphor ceramic attached to a heatsink.
Figure 8:
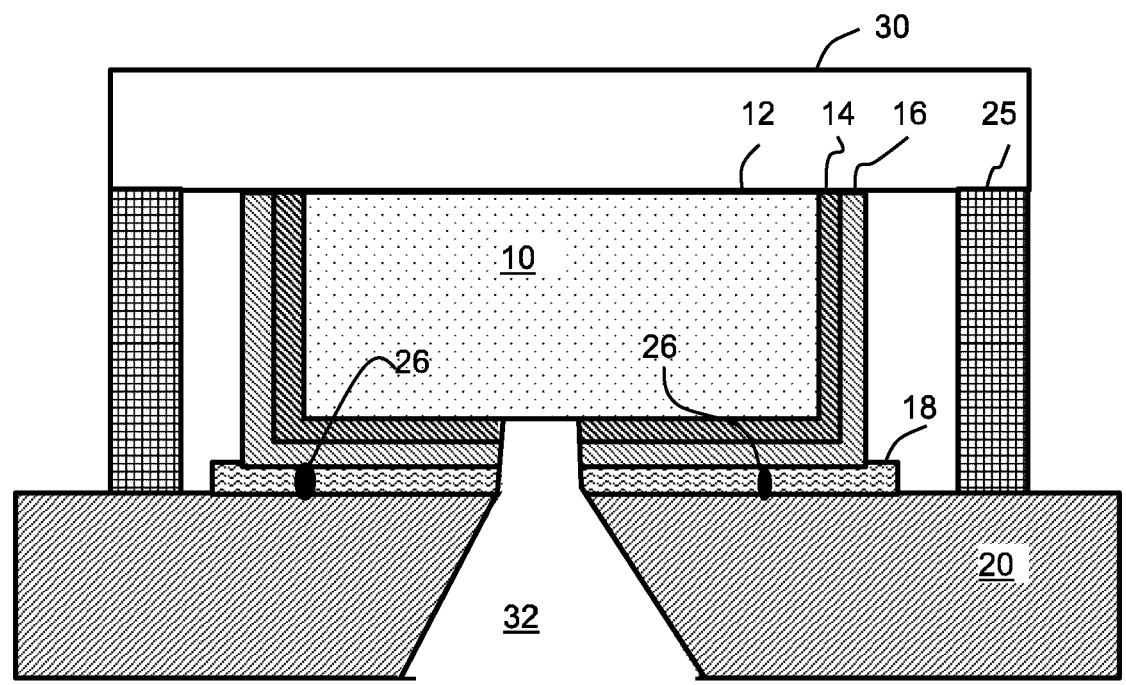
FIG. 8 shows a sixth example of a phosphor ceramic attached to a heatsink.

The examples of FIGS. 3 to 6 are reflecting designs. FIGS. 7 and 8 show transmissive designs.

FIG. 7 shows the ceramic phosphor tile 10 mounted in a well of the heat sink 20. The light entry face is now at the bottom surface of the ceramic phosphor tile 10 and there is a bottom opening 32 in the heat sink and the layers 14, 16, 18 over the ceramic phosphor tile. There is forward emission of light through the large open top surface of the ceramic phosphor tile, while laser pumping is through the opening 32 in the heat sink.

The reflector layer now partially covers the rear face (since there is an opening) and covers the side face.

In the design shown, the whole metal layer and the ceramic phosphor tile are hermetically sealed, with a top sapphire cover 30 so that no air can enter to oxidize the metal layer and/or the ceramic phosphor material.

During the operation of the laser source, the temperature increases and the metal layer 18 melts to form a liquid. This liquid maintains good thermal contact between the heat sink and the ceramic and no force is exerted onto the ceramic phosphor tile.

There may be an excess of liquid metal used located at the sides of the device as shown in FIG. 7. This allows for liquid movement during heating and cooling of the ceramic phosphor tile.

The light recycles within the ceramic phosphor tile by means of the reflection by layer 14 until the path reaches the large open top surface. The opening 32 may be provided with a layer selectively transmitting blue light and reflecting other wavelengths so that the phosphor-converted light cannot escape from the rear face.

FIG. 8 shows a modification to FIG. 7 in which the ceramic phosphor tile is again formed as a ceramic phosphor unit 10,14,16 which is mounted over the top of the heat sink 20, with the metal layer 18 between the bottom of the ceramic phosphor unit and the heat sink.

The ceramic phosphor tile is again sealed by a sapphire structure, which now has a top part 30 and a side wall 25. Spring loading may be applied between the side wall 25 and the heat sink.

FIG. 8 also shows that spacers 26 may be used to keep the distance between the ceramic phosphor unit and the heat sink to accommodate the metal layer 18.

Figure 9:
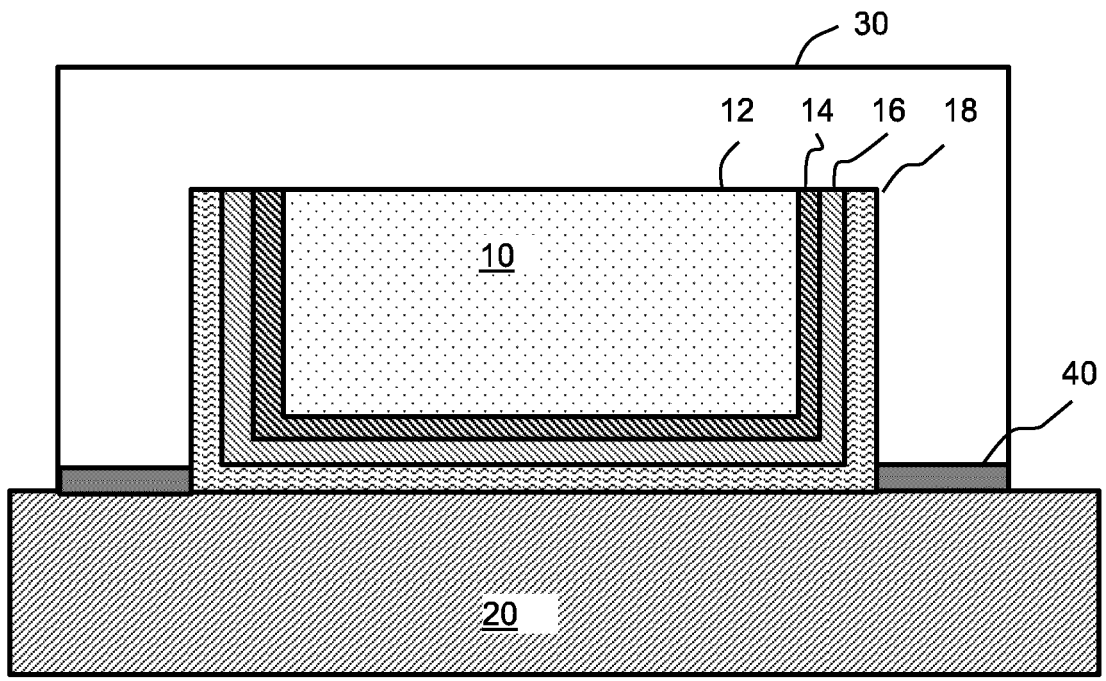
FIG. 9 shows a seventh example of a phosphor ceramic attached to a heatsink.

FIG. 9 shows a modification to FIG. 5 in which the ceramic phosphor tile 10 is mounted on top of the heat sink, and the combination of the ceramic phosphor tile and the layers 14, 16, 18 is surrounded by a sapphire cap 30. The sapphire cap 30 is adhered to the heat sink 20 by glue 40.

Figure 10:
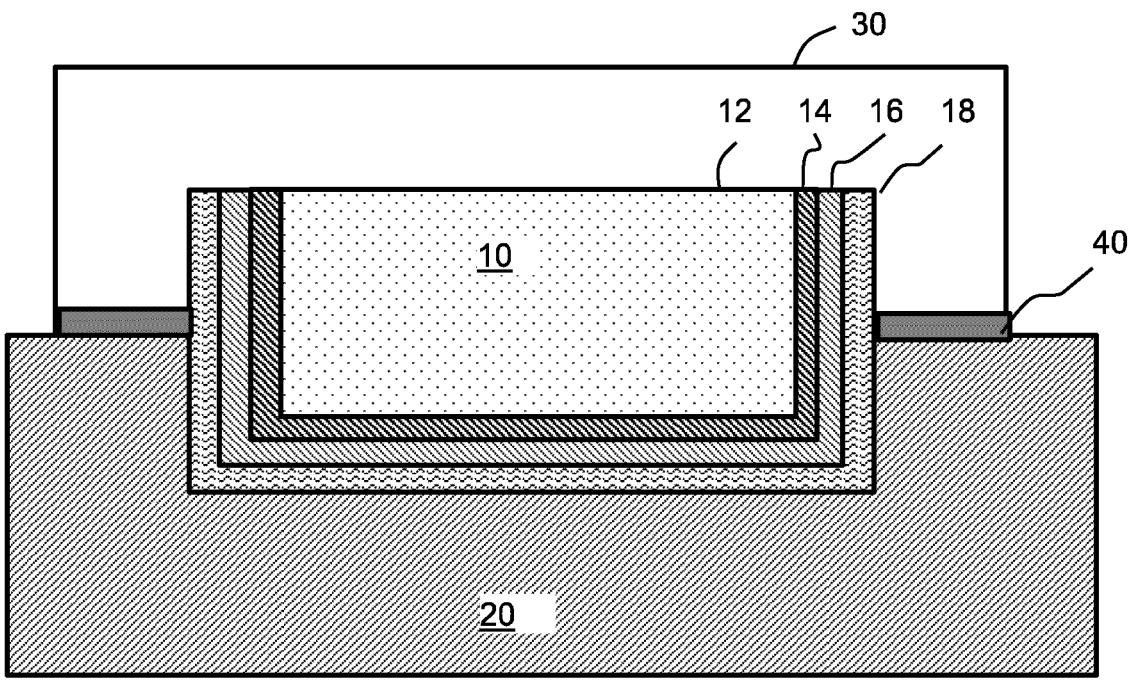
FIG. 10 shows an eighth example of a phosphor ceramic attached to a heatsink.

FIG. 10 shows a modification in which the ceramic phosphor tile 10 is partially buried in a well of the heat sink and partially projects over the top of the heat sink. The projecting top part of the ceramic phosphor tile (and the layers 14, 16, 18) is surrounded by a sapphire cap 30. The sapphire cap 30 is adhered to the heat sink 20 by glue 40.

An aluminum heat sink is mentioned above, but other metals may be used, such as copper or an aluminum allow or a copper alloy, it may also comprise vapor chamber, heat pipe etc.

There may be additional anti-reflection coatings within the structure, not mentioned above.

In the examples above, single type of reflective coating is used. However, in other examples, at least part of the bottom face may be covered with a first reflective layer, and at least part of the side surface may be covered with a second reflective layer, wherein the first reflective layer is different from the second reflective layer. In such examples, the first reflective layer may comprise aluminum and/or silver, while the second reflective layer may comprise titanium oxide, barium sulfate, aluminum oxide and/or boron nitride.

Some preferred phosphor materials have been mentioned above. However, the invention is not limited to any particular phosphor materials. The phosphor is preferably sintered to form a ceramic however it may be embedded in a ceramic host. A phosphor or phosphor blend is used to create the desired output light color, such as white.

In specific embodiments the luminescent material of the ceramic phosphor tile comprises a luminescent material of the type $A_3B_5O_{12}$:Ce, wherein A in embodiments comprises one or more of Y, La, Gd, Tb and Lu, especially (at least) one or more of Y, Gd, Tb and Lu, and wherein B in embodiments comprises one or more of Al, Ga, In and Sc.

Especially, A may comprise one or more of Y, Gd and Lu, such as especially one or more of Y and Lu. Especially, B may comprise one or more of Al and Ga, more especially at least Al, such as essentially entirely Al. Hence, especially suitable luminescent materials are cerium comprising garnet materials. Embodiments of garnets especially include $A_3B_5O_{12}$ garnets, wherein A comprises at least yttrium or lutetium and wherein B comprises at least aluminum. Such garnets may be doped with cerium (Ce), with praseodymium (Pr) or a combination of cerium and praseodymium; especially however with Ce.

Especially, B comprises aluminum (Al), however, B may also partly comprise gallium (Ga) and/or scandium (Sc) and/or indium (In), especially up to about 20% of Al, more especially up to about 10% of Al (i.e. the B ions essentially consist of 90 or more mole % of Al and 10 or less mole % of one or more of Ga, Sc and In); B may especially comprise up to about 10% gallium. In another variant, B and O may at least partly be replaced by Si and N.

The element A may especially be selected from the group consisting of yttrium (Y), gadolinium (Gd), terbium (Tb) and lutetium (Lu). Further, Gd and/or Tb are especially only present up to an amount of about 20% of A. In a specific embodiment, the garnet luminescent material comprises $(Y_{1-x}Lu_x)_3B_5O_{12}$:Ce, wherein x is equal to or larger than 0 and equal to or smaller than 1. The term ":Ce", indicates that part of the metal ions (i.e. in the garnets: part of the "A" ions) in the luminescent material is replaced by Ce. For instance, in the case of $(Y_{1-x}Lu_x)_3Al_5O_{12}$:Ce, part of Y and/or Lu is replaced by Ce. This is known to the person skilled in the art. Ce will replace A in general for not more than 10%; in general, the Ce concentration will be in the range of 0.1 to 4%, especially 0.1 to 2% (relative to A).

Assuming 1% Ce and 10% Y, the full correct formula could be $(Y_{0.1}Lu_{0.89}Ce_{0.01})_3Al_5O_{12}$.

Ce in garnets is substantially or only in the trivalent state, as is known to the person skilled in the art.

In embodiments, the luminescent material (thus) comprises $A_3B_5O_{12}$ wherein in specific embodiments at maximum 10% of B—O may be replaced by Si—N.

In specific embodiments the luminescent material comprises $(Y_{x1-x2-x3}A'_{x2}Ce_{x3})_3(Al_{y1-y2}B'_{y2})_5O_{12}$, wherein $x1+x2+x3=1$, wherein $x3>0$, wherein $0<x2+x3\leq0.2$, wherein $y1+y2=1$, wherein $0\leq y2\leq0.2$, wherein A' comprises one or more elements selected from the group consisting of lanthanides, and wherein B' comprises one or more elements selected from the group consisting of Ga, In and Sc. In embodiments, x3 is selected from the range of 0.001-0.1. In the present invention, especially $x1>0$, such as $>0.2$, like at least 0.8. Garnets with Y may provide suitable spectral power distributions.

In specific embodiments at maximum 10% of B—O may be replaced by Si—N. Here, B in B—O refers to one or more of Al, Ga, In and Sc (and O refers to oxygen); in specific embodiments B—O may refer to Al—O. As indicated above, in specific embodiments x3 may be selected from the range of 0.001-0.04. Especially, such luminescent materials may have a suitable spectral distribution (see however below), have a relatively high efficiency, have a relatively high thermal stability, and allow a high CRI (in combination with the first light source light and the second light source light (and the optical filter)). Hence, in specific embodiments A may be selected from the group consisting of Lu and Gd. Alternatively or additionally, B may comprise Ga. Hence, in embodiments the luminescent material comprises $(Y_{x1-x2-x3}(Lu,Gd)_{x2}Ce_{x3})_3(Al_{y1-y2}Ga_{y2})_5O_{12}$, wherein Lu and/or Gd may be available. Even more especially, x3 is selected from the range of 0.001-0.1, wherein $0<x2+x3\leq0.1$, and wherein $0\leq y2\leq0.1$. Further, in specific embodiments, at maximum 1% of B—O may be replaced by Si—N. Here, the percentage refers to moles (as known in the art); see e.g. also EP3149108. In yet further specific embodiments, the luminescent material comprises $(Y_{x1-x3}Ce_{x3})_3Al_5O_{12}$, wherein $x1+x3=1$, and wherein $0<x3\leq0.2$, such as 0.001-0.1.

In specific embodiments, the light generating device may only include luminescent materials selected from the type of cerium comprising garnets. In even further specific embodiments, the light generating device includes a single type of luminescent materials, such as $(Y_{x1-x2-x3}A'_{x2}Ce_{x3})_3(Al_{y1-y2}B'_{y2})_5O_{12}$. Hence, in specific embodiments the light generating device comprises luminescent material, wherein at least 85 wt. %, even more especially at least about 90 wt. %, such as yet even more especially at least about 95 wt. % of the luminescent material comprises $(Y_{x1-x2-x3}A'_{x2}Ce_{x3})_3(Al_{y1-y2}B'_{y2})_5O_{12}$. Here, wherein A' comprises one or more elements selected from the group consisting of lanthanides, and wherein B' comprises one or more elements selected from the group consisting of Ga In and Sc, wherein $x1+x2+x3=1$, wherein $x3>0$, wherein $0<x2+x3\leq0.2$, wherein $y1+y2=1$, wherein $0\leq y2\leq0.2$. Especially, x3 is selected from the range of 0.001-0.1. Note that in embodiments x2=0. Alternatively or additionally, in embodiments y2=0.

In specific embodiments, A may especially comprise at least Y, and B may especially comprise at least Al.

Alternatively or additionally, the luminescent material may comprise a luminescent material of the type $A_3Si_6N_{11}$:$Ce^{3+}$, wherein A comprises one or more of Y, La, Gd, Tb and Lu, such as in embodiments one or more of La and Y.

In embodiments, the luminescent material may alternatively or additionally comprise one or more of $M_2Si_5N_8$:$Eu^{2+}$ and/or $MAlSiN_3$:$Eu^{2+}$ and/or $Ca_2AlSi_3O_2N_5$:$Eu^{2+}$, etc., wherein M comprises one or more of Ba, Sr and Ca, especially in embodiments at least Sr. Hence, in embodiments, the luminescent may comprise one or more materials selected from the group consisting of (Ba,Sr,Ca)S:Eu, (Ba,Sr,Ca)AlSiN$_3$:Eu and (Ba,Sr,Ca)$_2$Si$_5$N$_8$:Eu. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by $Eu^{2+}$). For instance, assuming 2% Eu in CaAlSiN$_3$:Eu, the correct formula could be $(Ca_{0.98}Eu_{0.02})$AlSiN$_3$. Divalent europium will in general replace divalent cations, such as the above divalent alkaline earth cations, especially Ca, Sr or Ba. The material (Ba,Sr,Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Further, the material (Ba,Sr,Ca)$_2$Si$_5$N$_8$:Eu can also be indicated as $M_2Si_5N_8$:Eu, wherein M is one or more elements selected from the group consisting of barium (Ba), strontium (Sr) and calcium (Ca); especially, M comprises in this compound Sr and/or Ba.

In a further specific embodiment, M consists of Sr and/or Ba (not taking into account the presence of Eu), especially 50 to 100%, more especially 50 to 90% Ba and 50 to 0%, especially 50 to 10% Sr, such as $Ba_{1.5}Sr_{0.5}Si_5N_8$:Eu (i.e. 75% Ba; 25% Sr). Here, Eu is introduced and replaces at least part of M, i.e. one or more of Ba, Sr, and Ca). Likewise, the material (Ba,Sr,Ca)AlSiN$_3$:Eu can also be indicated as MAlSiN$_3$:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Eu in the above indicated luminescent materials is substantially or only in the divalent state, as is known to the person skilled in the art.

It is noted that the terms "laser" or "solid state laser" may refer to one or more of a semiconductor laser diode, such as GaN, InGaN, AlGaInP, AlGaAs, InGaAsP, lead salt, vertical cavity surface emitting laser (VCSEL), quantum cascade laser, hybrid silicon laser, etc.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A laser lighting device configured, in operation, to emit phosphor-converted light, the laser lighting device comprising:

a laser light source configured to, in operation, emit laser light;

a ceramic phosphor tile configured to receive laser light emitted by the laser light source, wherein the ceramic phosphor tile is configured for at least partly converting the laser light into the phosphor-converted light, the ceramic phosphor tile having a bottom face, a top face, and at least one side face arranged between the bottom face and the top face;

a reflective layer is configured over at least part of one or more of: the top face; the bottom face; and the at least one side face;

a heat sink;

a metal layer arranged between the heat sink and the reflective layer, wherein the metal layer has a melting point below 120° C.;

a protective layer arranged between the reflective layer and the metal layer to protect the reflective layer from the metal layer; and wherein the laser lighting device is configured to have metal of the metal layer in liquid form during operation of the laser light source.

2. The laser lighting device of claim 1, wherein the metal layer has a melting point above 35° C.

3. The laser lighting device of claim 1, wherein the metal layer has a melting point below 70° C.

4. The laser lighting device of claim 1, wherein the metal layer comprises an alloy comprising Gallium.

5. The laser lighting device of claim 4, wherein the alloy further comprises one or more of tin, copper, silver, bismuth, indium, zinc and antimony.

6. The laser lighting device of claim 4, wherein the ceramic phosphor tile comprises a luminescent material, wherein the luminescent material is selected from luminescent materials of the type $A_3B_5O_{12}$:Ce, wherein A comprises one or more of Y, La, Gd, Tb and Lu, and wherein B comprises one or more of Al, Ga, In and Sc.

7. The laser lighting device of claim 4, wherein the reflective layer comprises silver, aluminum, aluminum oxide, titanium dioxide, barium sulfate or boron nitride.

8. The laser lighting device of claim 4, wherein the metal layer has a melting point in the range of 35° C.-70° C.

9. The laser lighting device of claim 8, wherein the protective layer comprises nickel, titanium, and/or a metal oxide.

10. The laser lighting device of claim 4, wherein the thermal conductivity of the metal layer is greater than 70 W/m·K.

11. The laser lighting device of claim 4, wherein a stack of the reflective layer, the metal layer, the heat sink and the protective layer, cover:

the bottom face and at least part of the at least one side face; or the side face and at least part of the bottom face.

12. The laser lighting device of claim 4, wherein the ceramic phosphor tile, reflective layer and metal layer, and optionally a protective layer, are formed fixed into a well within the heat sink.

13. The laser lighting device of claim 4, comprising a seal for sealing the metal layer.

14. The laser lighting device of claim 4, comprising a temperature sensor for sensing a temperature of the metal layer and a controller for controlling the laser light source, wherein the laser light source is controlled by the controller based on the temperature sensed by the temperature sensor.

15. A laser lighting system selected from the group of a lamp, a luminaire, a projector device, a disinfection device, and an optical wireless communication device, comprising the laser lighting device of claim 4.

* * * * *